Patented June 29, 1926.

1,590,663

UNITED STATES PATENT OFFICE.

HANS ALTGELT AND OTTO HOCHMUTH, OF BIEBRICH-ON-THE-RHINE, GERMANY, ASSIGNORS TO KALLE & CO. AKTIENGESELLSCHAFT, OF BIEBRICH-ON-THE-RHINE, GERMANY, A CORPORATION OF GERMANY.

ENZYMES AND PROCESS OF ISOLATING THEM FROM THEIR SOLUTIONS.

No Drawing. Application filed March 17, 1925, Serial No. 16,256, and in Germany March 17, 1924.

The methods already known for separating enzymes are all more or less defective and they are, therefore, of little value from a technical point of view.

Now we have found that enzymes can be precipitated in a very simple manner with a good yield from their solutions and obtained in a solid stable form by saturating the solution completely or almost completely—according to the kind of salt used—with a neutral salt and then producing a precipitate in the solution by means of a water-soluble salt of an aromatic sulfonic acid.

The solution may be kept alkaline, preferably with ammonia, it may however also be neutral or even acid towards Congo-paper; furthermore it may be filtered before precipitation. The most suitable salts for saturating the solution are common salts, sodium sulfate or potassium chloride, also in the form of their naturally occurring kinds.

A solution of the said precipitating agent is used and therefore to the solution of the enzyme must be added so much more of the saturating salt that the required concentration is not diminished by the water contained in the solution of the precipitating agent. The precipitate contains the enzyme in combination with the sulfonic acid salt. For the purpose are eminently suitable the alkali salts of naphthalene-monosulfonic acid. The enzymes precipitated by means of the salt of the sulfonic acid are filtered from the solution and they may be dried in an appropriate manner.

The new process may also be carried out in the following modified manner:

The solution of the enzyme is saturated in the above indicated manner for instance with common salt and there is then produced in the known manner a slight precipitate for instance by means of sodium phosphate and calcium chloride. To the mass is then further added a salt of an aromatic sulfonic acid, for instance sodium naphthalene-a-monosulfonate. In this case the salt of the aromatic sulfonic acid exercises its action by enveloping the precipitate and rendering the solution capable of being easily filtered. This precipitate is now filtered off and then mixed with a small quantity of water to which a small quantity of ammonia has been added while stirring, until the salt of the aromatic sulfonic acid and the enzyme are dissolved. The solution, after being separated from the insoluble calcium phosphate or magnesium hydroxide, is saturated with a salt, for instance with common salt, whereby the salt of the aromatic sulfonic acid is salted out and then contains the whole ferment. Thus the enzyme may be obtained in an exceedingly high concentration.

In certain cases, it may be advantageous to filter the solution mixed with the saturating salt before adding the precipitating agent in order to remove all mechanical or any existing primarily precipitated or salted-out impurities.

The following examples illustrate our invention:

(I). 100 kgr. of malt-extract are dissolved in 800 litres of water, ammonium carbonate is added until the solution is slightly alkaline towards litmus-paper. After being filtrated the solution is mixed, if necessary, with common salt, while stirring, until it is saturated. Thereupon a solution, rendered slightly alkaline towards litmus-paper with ammonium carbonate, of 4 kgr. of sodium-naphthalene-a-monosulfonate in 20 litres of water is slowly run in. Thus a precipitate is formed which contains the whole of the enzyme combined with the sodium naphthalene-a-monosulfonate. The mass is filtered by suction, washed with a saturated solution of common salt, whereupon the cakes are pressed and carefully dried by the known methods.

Instead of employing 100 parts of malt-extract dissolved in 800 parts of water, 100 parts of the product obtainable according to the process of British Patent 16,198 of 1914, may be treated in the same manner as indicated and the same result.

The resulting product can be used in this form for technical purposes, for instance for desizing fabrics.

(II). 100 parts of a diluted aqueous extract from the pancreas gland are mixed, while stirring, with a mixture of 0,125 parts by weight of sodium phosphate and 0,8 parts by weight of potassium phosphate. To this mass is added common salt until saturation and the whole is filtered, if desired. There are then added, while well stirring, further 17 parts by weight of common salt and to the mixture are slowly run 50 parts by weight of a neutral solution of sodium naphthalene-a-monosulfonate of 20% strength. The resulting precipitate contains the whole of the enzyme. By very carefully drying the latter, preparations are obtained possessing the above described properties.

As above mentioned, the enzymes are obtained in a good yield and in the form of a powder which is entirely stable even when exposed to a higher temperature.

We claim:

1. Process for isolating enzymes from their solutions which consists in first saturating these solutions by addition of a salt and then adding to the solution a salt of an aromatic sulfonic acid.

2. Process for isolating enzymes from their solutions which consists in first saturating these solutions by addition of a salt and then mixing the solution with sodium naphthalene-a-monosulfonate.

3. Process for isolating enzymes from their solutions, which consists in first saturating these solutions by addition of a salt, producing a precipitate in the solution thus obtained, and finally adding a salt of an aromatic sulfonic acid.

4. Process for isolating enzymes from their solutions which consists in first saturating these solutions by adding a salt, producing a precipitate in the solution thus obtained, adding a salt of an aromatic sulfonic acid, filtering off the precipitate so obtained, treating the latter with water and finally mixing the separated solution with a salt having salting out properties.

5. As new products, enzymes compositions containing a salt of an aromatic sulfonic acid.

6. As new products, enzymes compositions containing a salt of the naphthalene-a-monosulfonic acid.

In testimony whereof they hereunto affix their signatures.

Dr. HANS ALTGELT.
Dr. OTTO HOCHMUTH.